United States Patent [19]
Ketcham

[11] Patent Number: 5,429,395
[45] Date of Patent: Jul. 4, 1995

[54] RETAINER ARRANGEMENT FOR EXTREME LOAD APPLICATIONS

[75] Inventor: Mark G. Ketcham, East China, Mich.

[73] Assignee: Bundy Corporation, Warren, Mich.

[21] Appl. No.: 246,749

[22] Filed: May 20, 1994

[51] Int. Cl.⁶ .............................................. F16L 55/00
[52] U.S. Cl. ................................. 285/87; 285/319; 285/351; 285/325
[58] Field of Search ............... 285/319, 233, 87, 320, 285/325, 351

[56] References Cited

U.S. PATENT DOCUMENTS

| | | |
|---|---|---|
| 2,427,260 | 9/1947 | Cowles . |
| 2,441,344 | 5/1948 | Bosworth . |
| 3,245,703 | 4/1966 | Mahly ........................ 285/319 |
| 3,409,314 | 11/1968 | Roe . |
| 3,414,299 | 12/1968 | Roe . |
| 3,560,026 | 2/1971 | Roe . |
| 3,711,125 | 1/1973 | Dehar . |
| 3,858,913 | 1/1975 | Gallagher ................. 285/319 X |
| 4,436,326 | 3/1984 | Peaster ..................... 285/233 X |
| 4,690,436 | 9/1987 | Hehl . |
| 4,725,081 | 2/1988 | Bauer . |
| 4,750,765 | 6/1988 | Cassidy et al. . |
| 4,802,697 | 2/1989 | Bartholomew ............. 285/319 |
| 4,925,217 | 5/1990 | Ketcham . |
| 5,067,754 | 11/1991 | Bartholomew ............. 285/319 |
| 5,161,830 | 11/1992 | Abe . |
| 5,161,834 | 11/1992 | Norkey ..................... 285/319 |
| 5,195,787 | 3/1993 | Bartholomew . |
| 5,197,770 | 3/1993 | Knapp ..................... 285/319 X |
| 5,275,448 | 1/1994 | McNaughton et al. ....... 285/319 |
| 5,324,081 | 6/1994 | Umezawa .................. 285/319 X |
| 5,338,071 | 8/1994 | Hohmann et al. ........... 285/319 |

FOREIGN PATENT DOCUMENTS

| | | |
|---|---|---|
| 2811985 | 11/1978 | Germany . |
| 3710853 | 10/1988 | Germany ................. 285/319 |
| 3924173 | 1/1991 | Germany ................. 285/319 |
| 453217 | 12/1934 | United Kingdom . |

Primary Examiner—Dave W. Arola
Attorney, Agent, or Firm—Dorn, McEachran, Jambor & Keating

[57] ABSTRACT

A quick connector coupling for forming a joint in a fluid line system consists of a female connector body having a bore which receives a male member formed at an end of a tube. A sleeve is secured on the male member and fits closely within the bore. A retainer arrangement is mounted on the male member axially outwardly of the sleeve. The retainer arrangement has a base that surrounds the male member axially outwardly of the bore entrance, and legs which extend away from the base and into the connector body. The legs have engagement means for engaging the connector body abutment surface to secure the retainer arrangment to the connector body, and for engaging the sleeve to retain the sleeve and male member in the bore.

13 Claims, 6 Drawing Sheets

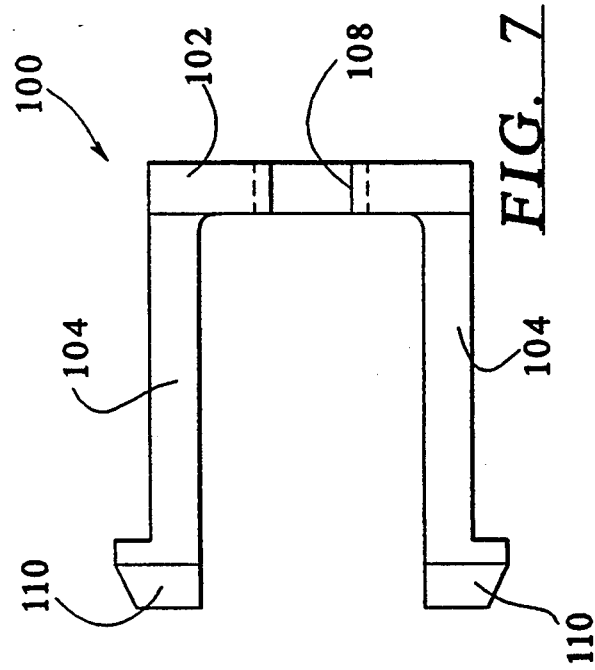
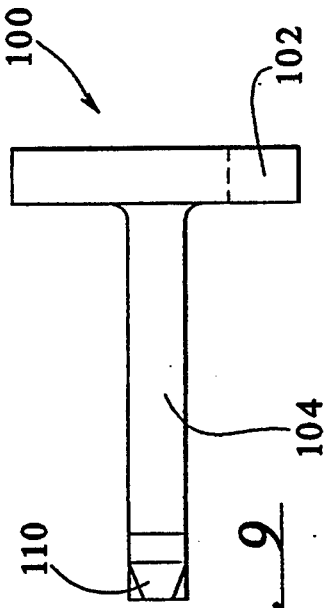
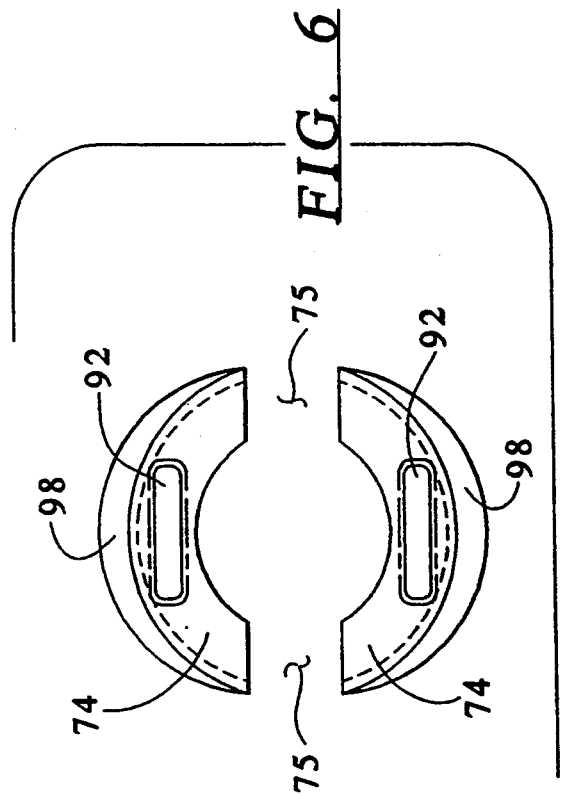
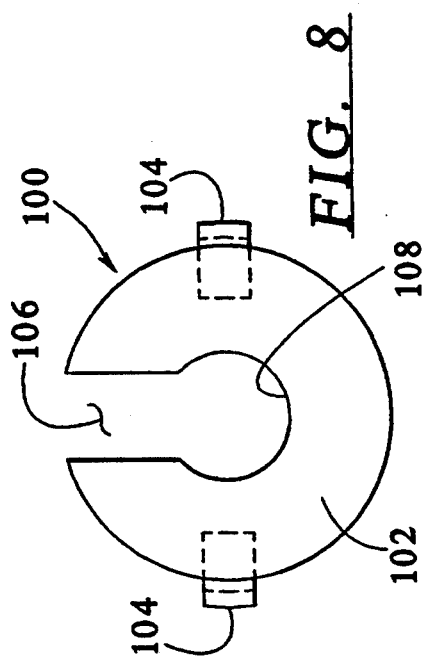

RETAINER ARRANGEMENT FOR EXTREME LOAD APPLICATIONS

BACKGROUND OF THE INVENTION

This invention relates to fluid line systems which include quick connector couplings, and more particularly to a quick connector coupling having a retainer arrangement capable of withstanding extreme loads occuring in high pressure systems.

In automotive and other fields, quick connector couplings are often utilized to provide a fluid connection between two components or conduits, thus establishing a fluid line between the two components, usually a rigid tube and a system element contained within a metal housing. Use of quick connector couplings is advantageous in that a sufficiently sealed and secured fluid line may be established with a minimum amount of time and expense.

In high pressure fluid lines of the type typically found in hydraulic brake, power steering, air conditioning or other systems, it is essential that quick connector couplings provide a strong and secure connection that will withstand extreme ranges of operational pressures, are quickly and easily connectable, and maintain a fluid-tight seal.

Prior art connectors, though suitable for many applications, have not always been reliable in high pressure systems. Typically, a quick connector coupling includes a retainer arrangement to secure the male member within the female connector body. The retainer arrangement usually has load-bearing members extending between an abutment surface associated with the connector body and an abutment surface associated with the male member.

The retainer arrangement of a quick connector coupling formed in a high pressure fluid line is subjected to a particularly high level of stress and pressure. The load-bearing members of known retainer arrangments, however, have typically had relatively small areas of surface contact with the connector body and with the male member abutment surfaces. The extreme pressures which must be borne in a high pressure system would be concentrated in these small areas of contact, resulting in diminished fatigue resistance and an unacceptably high rate of joint failure. Known retainer arrangements are, therefore, generally unsuitable for use in high pressure systems.

A clear need exists for a retainer arrangement capable of handling the extreme loads experienced in high pressure systems. It has been found that a reduction in stress concentration and increased fatigue resistance can be obtained by increasing the contact area of the load-bearing members of the retainer arrangement with the abutment surfaces associated with the connector body and with the male member. The present invention provides such a coupling having such a retainer arrangement.

SUMMARY OF THE INVENTION

The present invention provides a quick connector coupling for forming a joint in a fluid line system. The coupling includes a female connector body having a bore which extends axially inwardly from an entrance. A radially extending abutment surface is defined axially inwardly of the entrance.

A male member formed at an end of a tube is received within the bore of the connector body. A sleeve is secured on the male member and fits closely within the bore, mating with a radially outer surface of the male member and a radially inner surface of the connector body.

A retainer arrangement surrounds the male member axially outwardly of the sleeve. It includes a base that surrounds the male member axially outwardly of the bore entrance, and legs which extend away from the base and into the connector body. The legs have engagement means for engaging the connector body abutment surface to secure the retainer arrangement to the connector body, and for engaging the sleeve to retain the sleeve and male member in the bore.

The coupling may also include a latch mounted on the male member. The latch has a base surrounding the male member axially outwardly of the base of the retainer, and legs extending from the base and into the connector body. Prongs are formed at the end of the latch legs to engage the connector body abutment surface and to provide a secondary retention mechanism.

BRIEF DESCRIPTION OF THE DRAWINGS

FIG. 6 is a front elevation view of insert members which are apart of the retainer arrangement of FIG. 3;

FIG. 7 is a top plan view of a latch which is a part of the quick connector coupling of FIG. 1;

FIG. 8 is a front elevation view of the latch of FIG. 7;

FIG. 9 is a side elevation view of the latch of FIG. 7; and

DETAILED DESCRIPTION OF THE PREFERRED EMBODIMENTS

Figure 1:
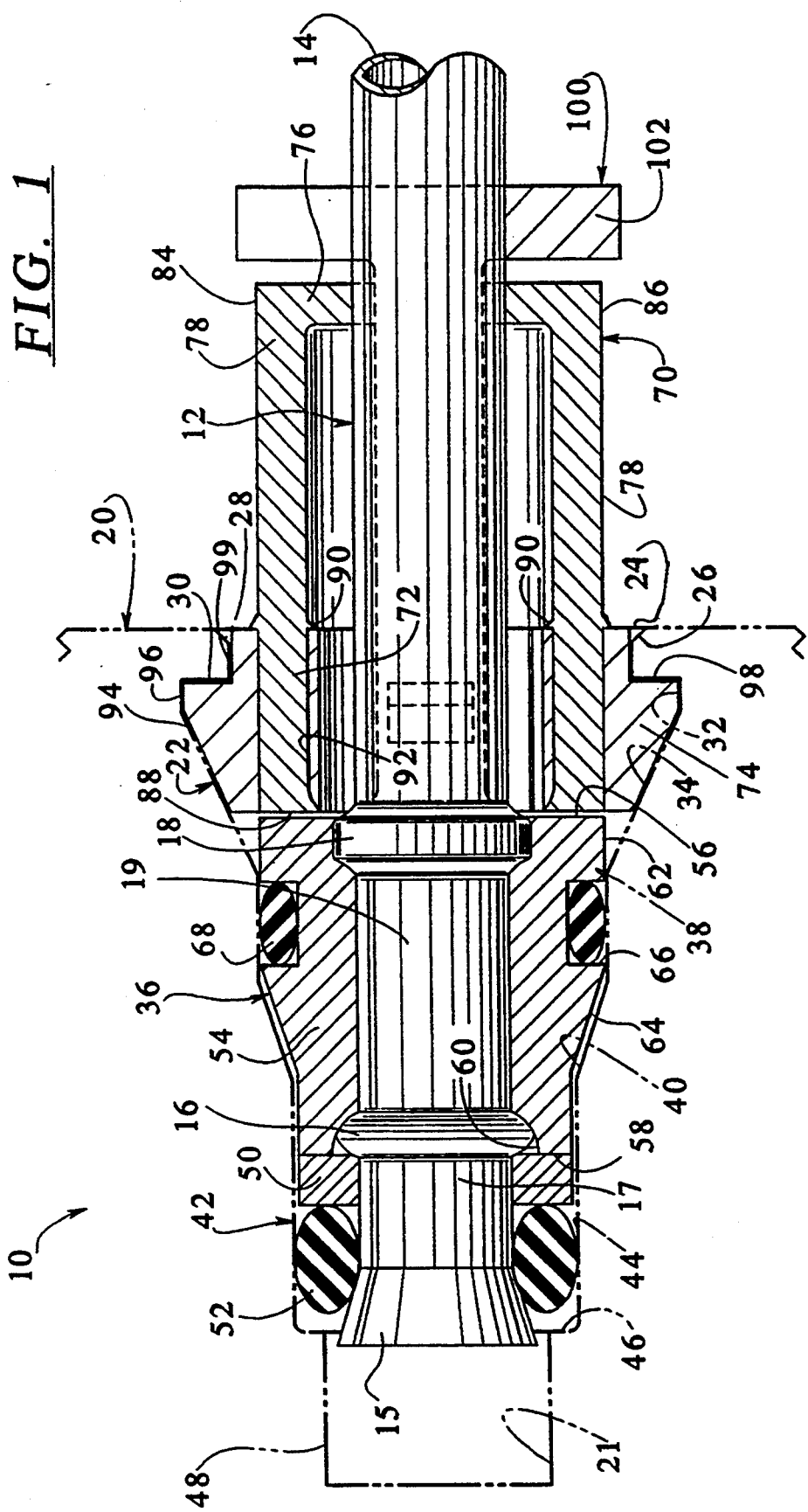
FIG. 1 is a partial sectional view of a quick connector coupling which embodies the present invention.
Figure 2:
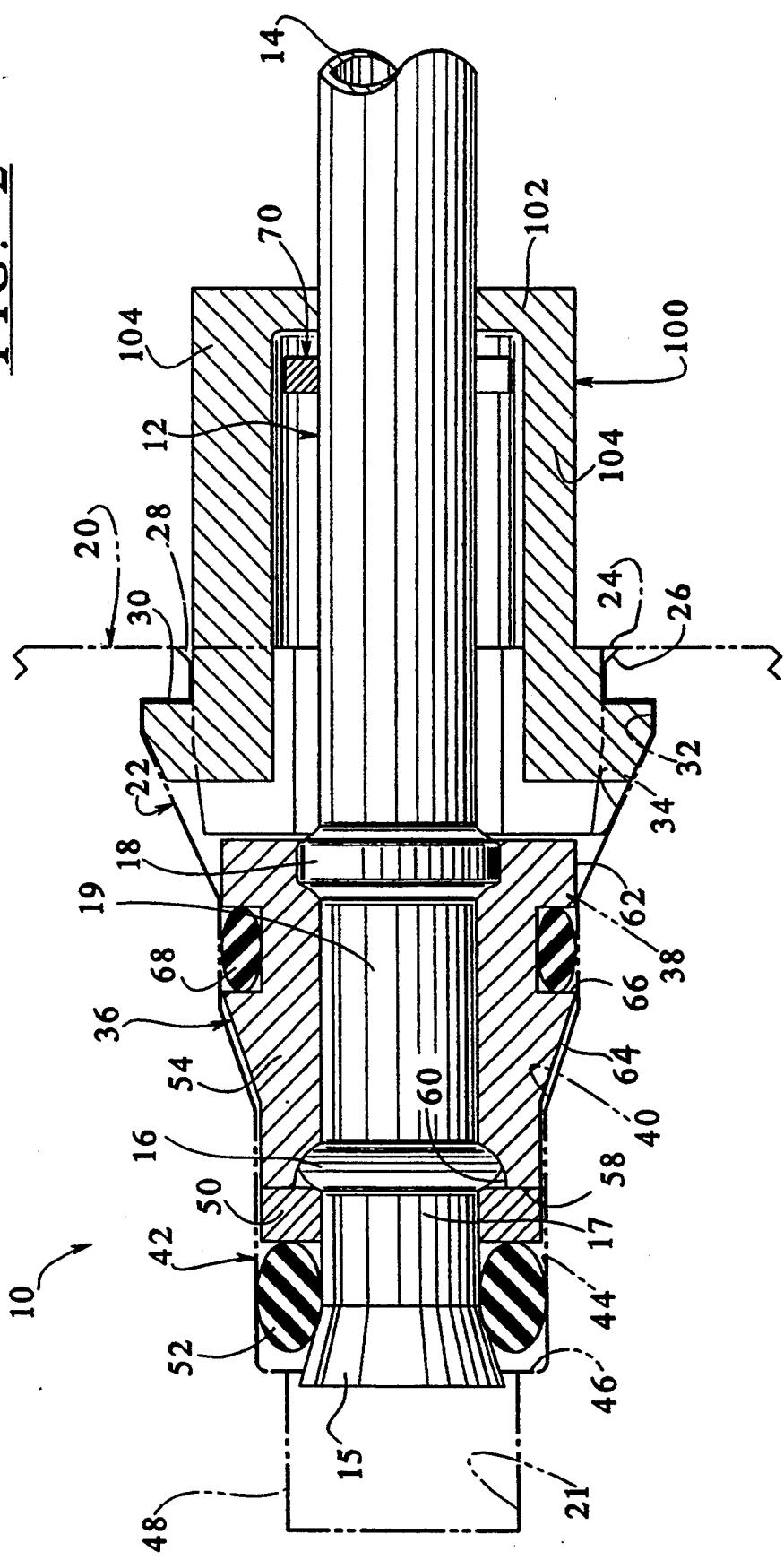
FIG. 2 is a partial sectional view of the quick connector coupling of FIG. 1, rotated ninety degrees.
Figure 4:
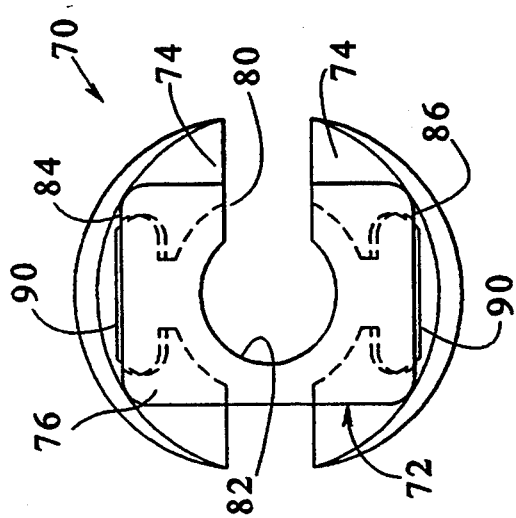
FIG. 4 is a front elevation view of the retainer arrangement of FIG. 3.
Figure 3:
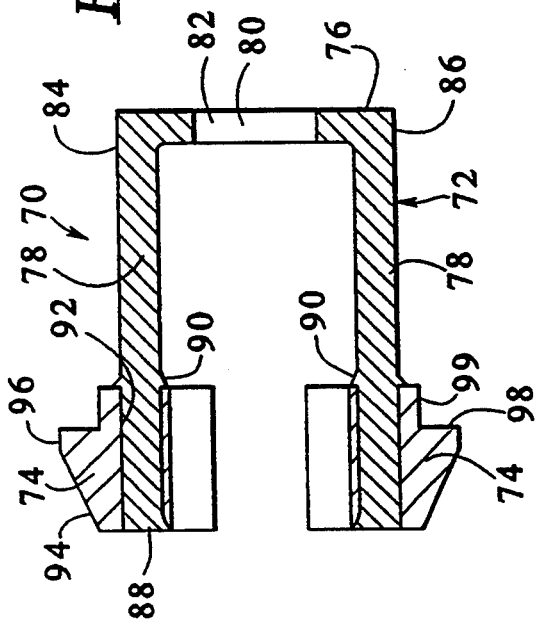
FIG. 3 is a sectional view of a retainer arrangment which is a part of the quick connector coupling of FIG. 1.

A quick connector coupling formed in a fluid line system is designated as 10 in FIGS. 1 and 2. Quick connector coupling 10 is comprised of a female connector body 20 and a male member 12 formed at an end of a tube 14 wich forms a part of a fluid line system. Tube 14 is typically connected to flexible tubing which leads to a source of high pressure fluid, such as a hydraulic brake, air conditioning or power steering line. Connector body 20 is typically a portion of an automotive system component, such as a master brake cylinder. Female connector body 20 and male member 12 are connectable to form a permanent, but severable, joint.

Female connector body 20 is hollow and defines an axial bore 21 extending inwardly from an entrance 24. Entrance 24 is defined by a radial annular rim 26. Rim 26 is chamfered at 28 to facilitate insertion of male member 12 into connector body bore 21.

Enlarged retainer housing portion 22 is formed in connector body 20 inwardly of rim 26. Retainer housing portion 22 includes a radially extending annular abutment surface 30. A first cylindrical surface 32 extends axially inwardly from abutment surface 30 for a short distance, and a first conical surface 34 extends axially and radially inwardly from surface 32 to a sleeve housing portion 36 of connector body 20.

Sleeve housing portion 36 is of reduced diameter relative to retainer housing portion 22. It includes a second cylindrical surface 38 extending axially inwardly from conical surface 34, and a second conical surface 40 extending axially and radially inwardly from surface 38 to a seal housing portion 42 of connector body 20.

Seal housing portion 42 is of reduced diameter relative to sleeve housing portion 36. It includes a third cylindrical surface 44 extending axially inwardly from conical surface 40. Seal housing portion 42 terminates in a radial shoulder 46.

Connector body bore 21 terminates in an end 48 remote from entrance 24. End 48 communicates with other portions (not shown) of the system component of which connector body 20 is a part.

Male member 12 is received within female connector body 20. Flared end 15 of male member 12 extends into, and communicates with, end 48 of bore 21. First enlarged upset 16 is spaced outwardly of flared end 15 a given distance to define seal retention portion 17. Second enlarged upset 18 is spaced outwardly of first upset 16 a given distance to define sleeve retention portion 19. Male member 12 is typically formed at the end of a rigid, metal tube 14.

A backup spacer 50 and a seal in the form of an "O" ring 52 are disposed in seal housing portion 42 of connector body 20 and surround seal retention portion 17 of male member 12. Spacer 50 and "O" ring 52 are secured on male member 12 between flared end 15 and first upset 16. "O" ring 52 is compressed radially between third cylindrical surface 44 of connector body 20 and male member 12, sealing off end 48 of bore 21 from the outward portions of bore 21. "O" ring 52 may also be compressed axially between spacer 50, and flared end 15 and/or radial shoulder 46.

A hollow, cylindrical sleeve 54 is disposed in sleeve housing portion 36 of connector body 20 and surrounds sleeve retention portion 19 of male member 12. It is secured on male member 12 between first upset 16 and second upset 18. Sleeve 54 extends between an outer annular face 56 and an inner annular face 58. The inner diameter of sleeve 54 is approximately equal to the outer diameter of sleeve retention portion 19 of male member 12, such that sleeve 54 fits tightly around male member 12 between upsets 16 and 18. This snug fit is effective to minimize relative radial movement between sleeve 54 and male member 12.

A sloped shoulder 60 is formed in the inner periphery of sleeve 54 adjacent inner face 58. Shoulder 60 engages first upset 16 of male member 12 and prevents withdrawl of member 12 from connector body 20. Inner face 58 extends past the crest of first upset 16, abutting spacer 50 and assisting in the seating of "O" ring 52.

The outer periphery of sleeve 54 mates with the inner periphery of sleeve housing portion 36 of connector body 20. A cylindrical surface portion 62 of sleeve 54 mates with second cylindrical surface 38 of sleeve housing portion 36, and a conical surface portion 64 of sleeve 54 mates with second conical surface 40. Conical surface portion 64 also serves as a stop to limit inward insertion of sleeve 54 and male member 12 into connector body bore 21.

The close fit of sleeve 54 both around male member 12 and within connector body 20 enhances system stability by preventing radial displacement of tube 14 relative to connector body 20. This is particularly important in high pressure automotive fluid systems, which are often subject to wide and extreme ranges of pressures. Excessive vibration, or bouncing, of tube 14 within connector body 20 would cause accelerated deterioration of the coupling and an eventual breakdown. The close fit between male member 12, sleeve 54 and connector body 20 promotes joint stability.

A groove 66 formed in cylindrical surface portion 62 of sleeve 54 houses "O" ring seal 68. "O" ring seal 68 provides a fluid-tight seal between sleeve 54 and connector body 20. This seal complements and bolsters the sealing protection provided by "O" ring 52.

A retainer arrangement 70 is mounted on male member 12 and is partially disposed within retainer housing portion 22 of connector body 20. It is illustrated in detail in FIGS. 3-6.

Retainer arrangement 70 is comprised of a main retainer body 72 having two compressive insert members 74 attached thereto. Retainer body 72 includes a "C" shaped semi-rectangular base 76. Two legs 78 extend away from base 76. Base 76 is open on one of its sides to define a compressive space 80. A central aperture 82 is formed through base 76 and is continuous with compressive space 80. Male member 12 extends through aperture 82 of base 76 and into connector body 20. The diameter of aperture 82 should approximate the diameter of tube 14 such that there is a sliding fit of base 76 around tube 14.

Figure 5:
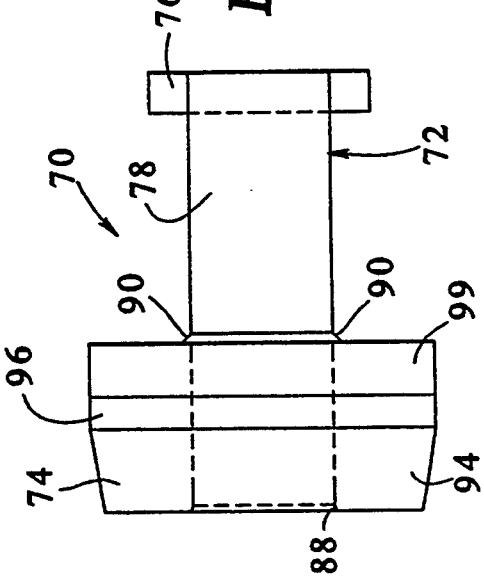
FIG. 5 is a top plan view of the retainer arrangment of FIG. 3.

Legs 78 extend away from top side 84 and bottom side 86 of base 76 and into retainer housing portion 22 of connector body 20. Legs 78 are rectangular in cross-section and have a width which is less than the width of sides 84 and 86, as is best seen in FIG. 5. Legs 78 are radially spaced from tube 14. Each leg 78 includes a flared end 88, and two opposed ridges 90 spaced a given distance from end 88. When assembled, flared ends 88 of retainer legs 78 extend into retainer housing portion 22 of connector body 20 and are positioned adjacent outer face 56 of sleeve 54.

A semi-circular compressive insert member 74 is securely mounted on each leg 78 between flared end 88 and ridges 90. FIG. 6, depicting insert members 74 alone, provides the best illustration. An axial bore 92 is formed through each insert 74 to facilitate mounting on legs 78. The cross-section of bores 92 mirrors the cross-section of legs 78, such that inserts 74 fit tightly on legs 78. Flared ends 88 and ridges 90 secure inserts 74 on legs 78.

Insert members 74 fill the radial space between legs 78 and the interior surfaces of retainer housing portion 22. Each insert 74 includes a semi-conical surface 94 which mates with retainer housing conical surface 34; a semi-cylindrical surface 96 which mates with retainer housing cylindrical surface 32; a radial shoulder 98 which bears against retainer housing abutment surface 30; and a semi-cylindrical surface 99 which bears against connector body rim 26. Each of these outer peripheral surfaces of inserts 74 is in mating contact with the adjacent interior surfaces of retainer housing portion 22 over a majority of its surface area. As seen in FIG. 1, the result is a snug, tight fit of members 74 within retainer housing portion 22.

The fitting of insert members 74 within retainer housing portion 22 and, in particular, the abutment of radial shoulders 99 against abutment surface 30, locks retainer arrangment 70 into place within connector body 20. As a result, sleeve 54 is retained within connector body 20, since its outer face 56 engages insert members 74 and flared ends 88 of legs 78. Male member 12, in turn, is retained in connector body 20 due to the securement of sleeve 54 on male member 12 between upsets 16 and 18.

Base 76 of retainer body 72 is formed of a flexible, resilient material. Compressive space 80 permits temporary deformation of base 76 through application of inwardly directed pressure on legs 78. Squeezing legs 78 inwardly causes inward radial displacement of insert members 74. Thus, retainer arrangment 70 may be inserted into, or removed from, connector body 20 by applying a squeeze to legs 78 to radially displace insert members 74 an amount sufficient to allow their passage through connector body entrance 24. When a squeezing force is no longer applied to legs 78, they spring back into their normal orientation.

Retainer arrangment 70 is particularly useful for extreme load applications. In high pressure fluid systems, extreme loads are the norm. An automotive hydraulic brake system is one example. These extreme loads are ultimately borne by the portions of the retainer which bear against the connector body. Typical prior art retainers have had relatively small areas of surface contact with the connector body. Thus, the loads in these prior art connectors are concentrated in very small areas, leading to an accelerated rate of joint failure. For this reason, quick connect couplings have often been considered unsuitable for extreme load applications.

The present invention maximizes surface contact between retainer arrangement 70 (specifically, insert members 74) and the interior surfaces of connector body 20. The loads are spread out over a large area, resulting in vastly reduced stress concentration and increased fatigue resistance. Joint integrity is maintained, even in extreme load environments, without sacrifice of the convenience, simplicity and other advantages associated with quick connector couplings.

A latch 100 is mounted on male member 12 outward of retainer arrangement 70 and is partially disposed within retainer housing portion 22 of connector body 20. It is illustrated in detail in FIGS. 7–9.

Latch 100 is comprised of a "C" shaped semi-circular base 102 and two legs 104 extending away from base 102. Like base 76 of retainer arrangement 70, latch base 102 is open on one of its sides to define a compressive space 106. A central aperture 108 is formed through base 102 and is continuous with compressive space 106. Male member 12 extends through aperture 108 of base 102 and into connector body 20. The diameter of aperture 108 should approximate the diameter of tube 14 such that there is a sliding fit of base 102 around tube 14.

Legs 104 extend away from base 102 and into retainer housing portion 22 of connector body 20. Each leg 104 is offset ninety degrees from compressive space 106. Latch 100 is oriented so that base 102 is outward of retainer base 76, and legs 104 are offset ninety degrees from retainer legs 78. This orientation permits both the retainer and latch legs to be received within connector body 20.

Like retainer legs 78, latch legs 104 are radially spaced from male member 12. The spacing of legs 104 from male member 12, however, is slightly greater than the spacing of legs 78 from member 12 (see FIG. 2). A prong 110 is formed at the end of each leg 104. Prongs 110 are shaped to engage the interior surfaces of retainer housing portion 22, securely locking latch 100 to connector body 20.

As seen in FIG. 2, prongs 110 also engage portions of retainer insert members 74. Prongs 110 fill the spaces 75 (FIG. 6) separating insert members 74. The presence of prongs 110 makes it impossible to squeeze insert members 74, and legs 78, inwardly. Consequently, retainer arrangment 70 cannot be removed from connector body 20 without first removing latch 100. Thus, latch 100 enhances the joint stability already provided by retainer arrangment 70. It should be noted that while latch 100 provides secondary, or backup retention ability, a secure coupling may be obtained using only retainer arrangment 70.

Base 102 is formed of a flexible, resilient material. Application of an inward squeeze to legs 104 displaces legs 104 radially inwardly, facilitating installation and removal of latch 100. Relaxing legs 104 permits latch 100 to spring back to its normal orientation.

To facilitate shipping and assembly, the sealing and retention components of coupling 10 are normally packaged as one unit on male member 12. This entire unit is then easily installed into connector body 20. The steps for asssembling the various coupling components onto male member 12 are illustrated in FIGS. 10–13.

Figure 10:
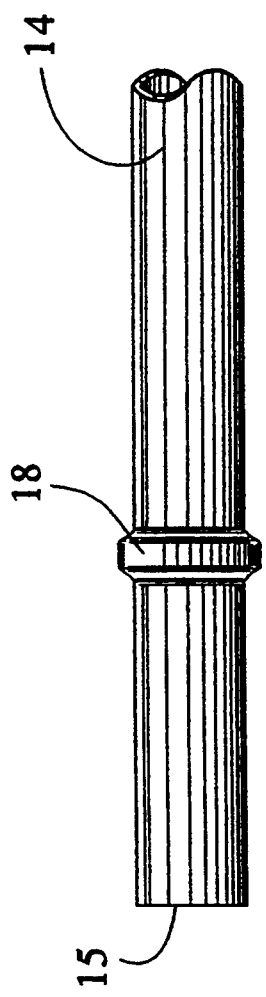
FIGS. 10-13 are a series of partial sectional views illustrating steps in the assembly of the quick connector coupling of FIG. 1.
Figure 11:
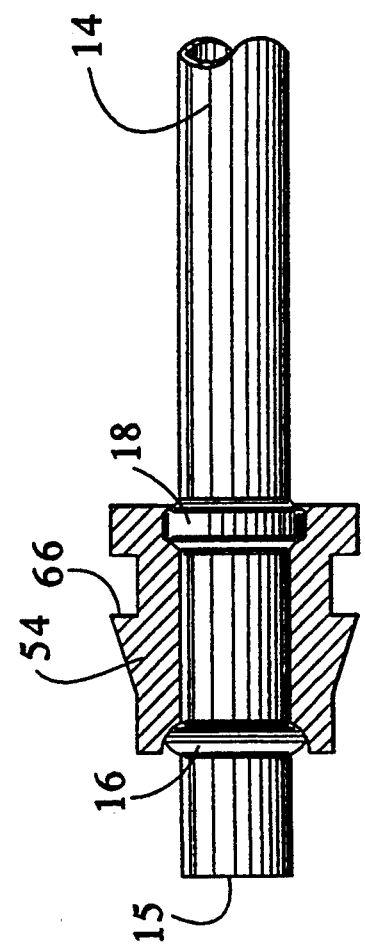
Figure 12:
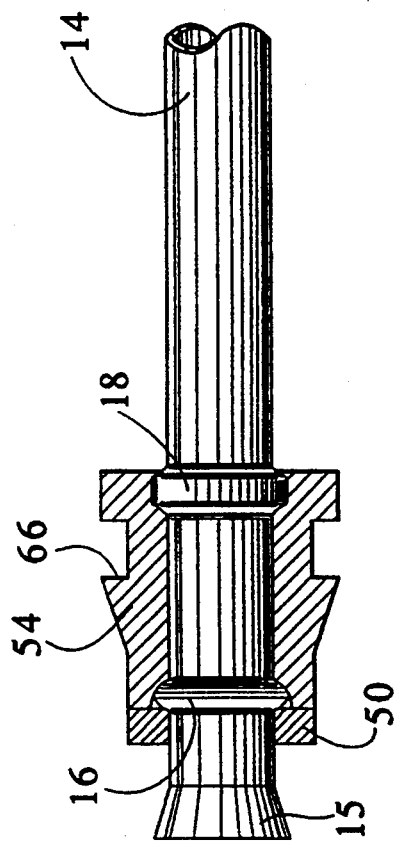
Figure 13:
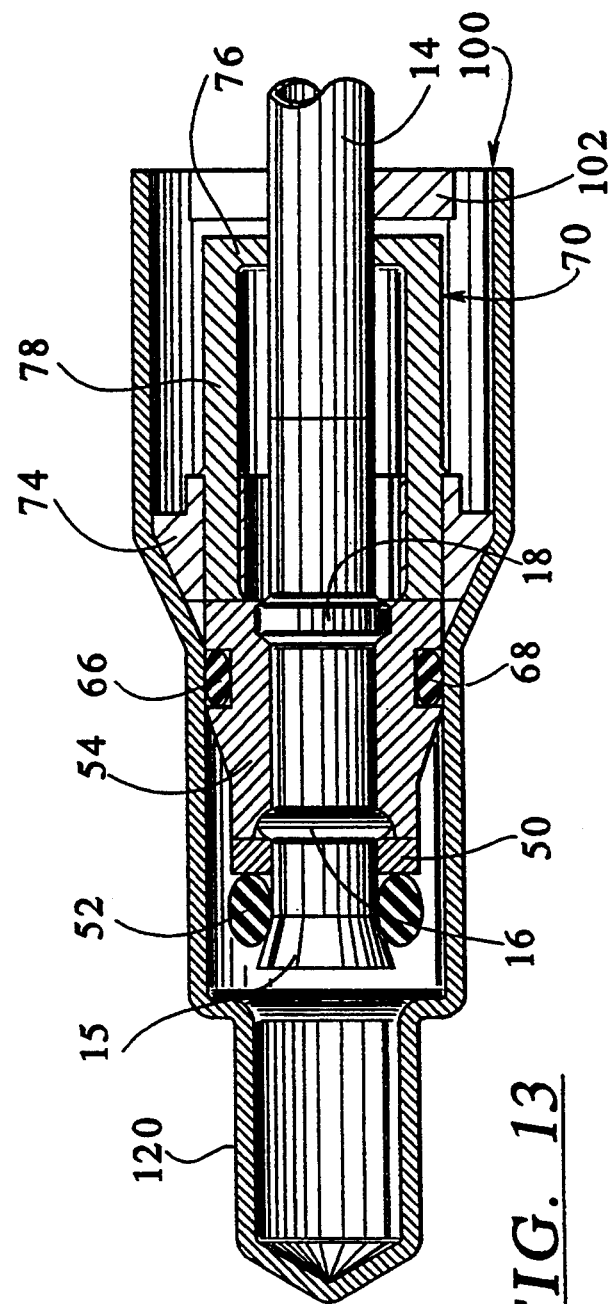

Upset 18 is first formed on tube 14 (FIG. 10). Sleeve 54 is then loaded onto tube 14 from tube end 15 to abut upset 18. Upset 16 is formed to secure sleeve 54 on tube 14 (FIG. 11). Next, spacer 50 is loaded onto tube 14 to abut sleeve 54 and end 15 is flared to secure spacer 50 on tube 14 (FIG. 12). "O" ring 52 is expanded over flared end 15 and seated next to spacer 50. "O" ring 68 is expanded over sleeve 54 and seated in sleeve groove 66.

Retainer arrangement 70 is then loaded onto the end of tube 14 remote from flared end 15 such that legs 78 and insert members 74 abut sleeve 54. Finally, latch 100 is loaded onto tube 14 such that latch base 102 is immediately outward of retainer base 76 and latch prongs 110 fill the spaces 75 separating inserts 74. A protective cap 120 (FIG. 13) may be slipped over the entire assembly to protect the components prior to installation. into connector body 20 (i.e. during shipping and handling).

A male member unit assembled as shown in FIGS. 10–13 (with protective cap 120 omitted) may be directly inserted into female connector body 20. All parts of the preassembled male unit pass through bore entrance 24 with little or no resistance, excepting retainer arrangement 70 and latch 100. The close fit of sleeve 54 within sleeve housing portion 36 aids in guidance of the assembly through connector body bore 21.

The chamfered portions 28 of rim 26, together with conically shaped end portions of retainer legs 78 and latch legs 104, assist in flexing the retainer and latch legs inwardly so that they may pass through entrance 24. Retainer arrangement 70 should be fully inserted prior to insertion of latch 100. If needed, retainer legs 78, and then latch legs 104, may be squeezed inwardly to assist in moving the legs through entrance 24.

After the radially greatest portions of retainer arrangement 70, and then latch 100, have passed completely by rim 26, the retainer and latch legs 78 and 104, respectively, spring outwardly into a normal, unflexed state. Retainer insert members 74 and latch prongs 110 engage the interior surfaces of retainer housing portion 22 to retain male member 12 in connector body 20. Radial abutment surface 30 of retainer housing portion 22 prevents outward axial displacement of both retainer arrangment 70 and latch 100.

When connected in this manner, quick connector coupling 10 provides closed fluid communication between one component, represented by connector body 20, and another component, represented by tube 14. The connection is securely sealed. "O" ring 52 is compressed radially between seal retention portion 17 of male member 12 and cylindrical surface 44 of connector body seal housing portion 42, and may be compressed axially between shoulder 46 and spacer 50. Sleeve "O" ring 68 ensures a fluid-tight connection.

Disconnection of coupling 10 is accomplished by first flexing latch legs 104 inwardly and withdrawing latch 100 from connector body 20. Next, retainer legs 78 are flexed inwardly and retainer arrangement 70 is withdrawn from connector body 20. Male member 12, no longer retained within connector body 20, may then be freely withdrawn. Retainer arrangement 70 and/or latch 100 may be serviced or replaced without affecting the remaining components of coupling 10.

Various features of the present invention have been explained with reference to the embodiments shown and described. It should be understood that modification may be made without departing from the spirit and scope of the invention.

I claim:

1. A quick connector coupling for forming a joint in a fluid line system comprising:
   a female connector body defining a bore, said bore extending axially inwardly into said connector body from an entrance, a radially extending abutment surface being defined axially inwardly of said entrance;
   a male member formed at an end of a tube provided with a first and second enlarged upset, said male member being received within said bore of said connector body;
   said sleeve secured on said male member between a first enlarged upset and said second enlarged upset, said sleeve fitting closely within said bore and mating with a radially outer surface of said male member and a radially inner surface of said connector body;
   a retainer arrangement mounted on said male member axially outwardly of said sleeve, said retainer arrangment including a base surrounding said male member axially outwardly of said bore entrance, legs extending away from said base into said connector body, said legs provided with raised portions on ends thereof remote from said base, and insert members secured between and by said raised portions on ends of said legs remote from said base, said insert members engaging said abutment surface to secure said retainer arrangement to said connector body, and engaging said sleeve to retain said sleeve and said male member in said bore.

2. A coupling as claimed in claim 1 wherein said first enlarged upset is formed on said male member axially inwardly of said sleeve, said sleeve contacting said first upset to retain said male member in said bore.

3. A coupling as claimed in claim 2 wherein said second enlarged upset is formed on said male member axially outwardly of said sleeve, said second upset contacting said sleeve to retain said sleeve on said male member.

4. A coupling as claimed in claim 1 wherein each of said insert members has a radial shoulder which is in mating contact with said abutment surface of said connector body.

5. A coupling as claimed in claim 4 wherein said raised portions include ends of said legs remote from said base being flared, and ridges are formed on said legs a given distance from said flared ends, said insert members being secured on said legs between and by said flared ends and said ridges.

6. A coupling as claimed in claim 4 wherein said insert members are semi-circular in shape.

7. A coupling as claimed in claim 4 wherein said insert members fill the radial space between said legs and said connector body over the majority of the axial length of said insert members.

8. A coupling as claimed in claim 4 wherein said connector body includes a cylindrical surface extending axially inwardly from said abutment surface, and said insert members include cylindrical surfaces extending axially inwardly from said radial shoulder in mating contact with said cylindrical surface of said connector body.

9. A coupling as claimed in claim 8 wherein said connector body includes a conical surface extending axially and radially inwardly from said cylindrical surface, and said insert members include conical surfaces extending axially and radially inwardly from said cylindrical surfaces of said insert members in mating contact with said conical surfaces of said connector body.

10. A coupling as claimed in claim 1 wherein said base of said retainer arrangement is "C" shaped and is formed of a flexible, resilient material, such that radial compression of said base causes inward radial flexing of said legs.

11. A coupling as claimed in claim 1 and further comprising a latch mounted on said male member, said latch having a base surrounding said male member axially outwardly of said base of said retainer arrangement to prevent removal of said retainer arrangement from said connector body, legs extending from said base and into said connector body, and prongs formed at ends of said latch legs remote from said latch base which engage said radially extending abutment surface of said connector body to secure said latch onto said connector body.

12. A coupling as claimed in claim 11 wherein said latch legs are offset ninety degrees from said legs of said retainer arrangement.

13. A coupling as claimed in claim 1 wherein said fluid line system is an automotive hydraulic brake system.

* * * * *